United States Patent
Cutler

(10) Patent No.: US 8,977,209 B2
(45) Date of Patent: Mar. 10, 2015

(54) METHOD AND SYSTEM FOR DETECTING AN RF TRANSMITTER OR TRANSMITTER TYPE USING A NETWORK OF PROGRAMMABLE RF RECEIVERS

(75) Inventor: Robert T. Cutler, Everett, WA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 1906 days.

(21) Appl. No.: 11/345,444

(22) Filed: Jan. 31, 2006

(65) Prior Publication Data
US 2007/0178845 A1 Aug. 2, 2007

(51) Int. Cl.
*H04B 17/00* (2006.01)

(52) U.S. Cl.
CPC .................................. *H04B 17/002* (2013.01)
USPC ...... 455/67.11; 455/418; 455/515; 455/550.1

(58) Field of Classification Search
USPC ............. 455/67.11, 62, 63.11, 515, 513, 514, 455/418–420, 550.1, 552.1, 553.1
See application file for complete search history.

(56) References Cited

U.S. PATENT DOCUMENTS

| | | | |
|---|---|---|---|
| 6,301,514 B1* | 10/2001 | Canada et al. | 700/108 |
| 7,088,950 B2* | 8/2006 | Tassberg et al. | 455/3.01 |
| 7,424,268 B2* | 9/2008 | Diener et al. | 455/62 |
| 2004/0028003 A1* | 2/2004 | Diener et al. | 370/319 |
| 2005/0227627 A1* | 10/2005 | Cyr et al. | 455/67.11 |
| 2006/0046716 A1* | 3/2006 | Hofstaedter et al. | 455/432.2 |

* cited by examiner

*Primary Examiner* — Nhan Le

(57) ABSTRACT

One or more of the programmable RF receivers or other devices in the network may be programmed to determine whether one or more defining characteristics associated with a particular RF transmitter or transmitter type are present in RF data. The one or more defining characteristics are used to detect the use of an RF transmitter or transmitter type.

21 Claims, 6 Drawing Sheets

METHOD AND SYSTEM FOR DETECTING AN RF TRANSMITTER OR TRANSMITTER TYPE USING A NETWORK OF PROGRAMMABLE RF RECEIVERS

BACKGROUND

RF transmitters are used for a variety of purposes, such as, for example, broadcast radio and handheld communication devices. It is sometimes desirable to determine when RF transmitters are in use. Law enforcement officials, for example, may want to track or locate an RF transmitter as part of a criminal or terrorist investigation. Investigating the unauthorized or unintentional transmission of RF signals is another application where it is desirable to detect the use of an RF transmitter.

A signal may not be detected by traditional techniques if the transmitter is located some distance away. Signal power decreases with distance, so detection is dependent on the signal-to-noise (SNR) requirements for the signal detection device and the distance to the signal source. Most detection and geolocation techniques require a positive SNR at the detectors.

The techniques may also require a continuous signal or a signal that appears on a regular basis. Some RF transmitters such as low-power walkie-talkies or Family Service Radios transmit an RF signal for a limited amount of time and at random times. These short signal bursts can make it difficult to detect or geolocate the RF transmitter.

SUMMARY

In accordance with the invention, a method and system for detecting an RF transmitter or transmitter type using a network of programmable RF receivers are provided. One or more of the programmable RF receivers or other devices in the network may be programmed to determine whether one or more defining characteristics associated with a particular RF transmitter or transmitter type are present in RF data. The one or more defining characteristics are used to detect the use of an RF transmitter or transmitter type. The programmable RF receivers may process RF data independently or one or more programmable RF receivers may be programmed to transmit RF data to a central processing device for processing.

DETAILED DESCRIPTION

The following description is presented to enable one skilled in the art to make and use embodiments in accordance with the invention, and is provided in the context of a patent application and its requirements. Various modifications to the disclosed embodiments will be readily apparent to those skilled in the art, and the generic principles herein may be applied to other embodiments. Thus, the invention is not intended to be limited to the embodiments shown, but is to be accorded the widest scope consistent with the appended claims and with the principles and features described herein.

Embodiments in accordance with the invention detect an RF transmitter or transmitter type using a network of programmable RF receivers. One or more RF receivers or a central processing device connected to the RF receivers determine whether one or more defining characteristics associated with an RF transmitter or transmitter type are present in RF data. The defining characteristics represent characteristics of the RF transmitter or characteristics associated with the operation of the RF transmitter. The use or location of the RF transmitter or transmitter type is determined through the detection of one or more defining characteristics in RF data acquired by one or more RF receivers. Examples of defining characteristics include, but are not limited to, average power and other statistical measurements of the power distribution of a signal, power transients, phase transients, frequency transients, transmitter operating frequency, and transmitter model or manufacturer. Allowing a network of geographically distributed RF receivers to monitor an area increases the probability of detecting the use of an RF transmitter or transmitter type in that area.

Figure 1:
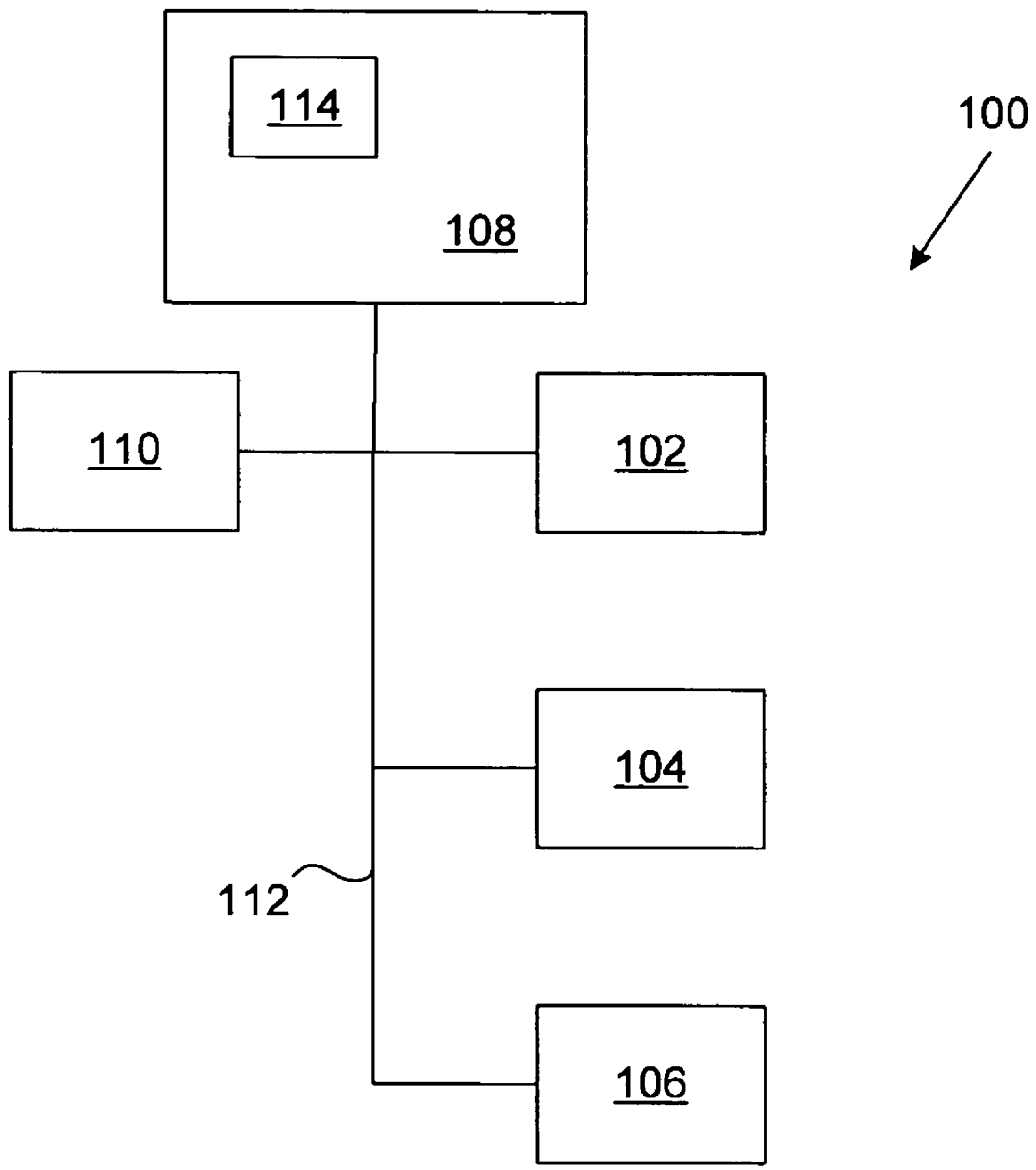
FIG. 1 is a diagrammatic illustration of a network of RF receivers in an embodiment in accordance with the invention.

FIG. 1 is a diagrammatic illustration of a network of RF receivers in an embodiment in accordance with the invention. Network 100 includes RF receivers 102, 104, 106, central processing device 108, and common network clock 110. RF receivers 102, 104, 106 are devices that receive RF data and signals for purposes other than cellular applications. For example, RF receivers 102, 104, 106 are RF sensors used to detect and geolocate RF transmitters in an embodiment in accordance with the invention. Each RF receiver 102, 104, 106 may be implemented as a discrete component or integrated within another device.

RF receivers 102, 104, 106 are located indoors or outdoors in any geographical area. For example, RF receivers 102, 104, 106 are positioned in different locations in a neighborhood in an embodiment in accordance with the invention. In another embodiment in accordance with the invention, RF receivers 102, 104, 106 are positioned in different locations in a city or county. And in another embodiment in accordance with the invention, RF receivers 102, 104, 106 are positioned in different locations in a region or state.

RF receivers 102, 104, 106 are connected to central processing device 108 and common network clock 110 through network connection 112. Central processing device 108 is implemented as a computer in an embodiment in accordance with the invention. Central processing device 108 is implemented with other types of devices in other embodiments in accordance with the invention. For example, central processing device 108 is implemented as another RF receiver in an embodiment in accordance with the invention.

Common network clock 110 is integrated within central processing device 108 in an embodiment in accordance with the invention. In other embodiments in accordance with the invention, common network clock 110 is implemented as a discrete device or integrated within an RF receiver or other network device in network 100.

Network connection 112 is implemented as a wired connection in an embodiment in accordance with the invention. For example, network connection 112 is a wired local area network (LAN) in an embodiment in accordance with the invention. In other embodiments in accordance with the invention, network connection 112 is a wireless network connection or a combination of wired and wireless connections.

Central processing device 108 and RF receivers 102, 104, 106 exchange timing information via network connection 112. The timing information is used to synchronize RF receivers 102, 104, 106 to a common time defined by common network clock 110. Network 100 uses the Institute of Electrical and Electronic Engineers (IEEE) 1588 Standard to synchronize RF receivers 102, 104, 106 in an embodiment in accordance with the invention. Other embodiments in accordance with the invention may implement different time synchronizing protocols.

The required accuracy in synchronizing RF receivers 102, 104, 106 to a common time depends on the application. Each application can have a different tolerance level for errors in determining distance or performing other functions. A number of factors affect accuracy, including, but not limited to, the location of an RF receiver, the signal transmission speed (typically one foot per nanosecond), noise, and the physical environment (e.g. structures, ground topology) near or surrounding the RF receiver.

RF receivers 102, 104, 106 also use network connection 112 for data transmission in an embodiment in accordance with the invention. For example, RF receiver 102 may transmit or receive data from RF receiver 106 in network 100. RF receivers 102, 104, 106 may also transmit data to central processing device 108 for data processing and analysis.

Central processing device 108 includes characteristics database 114 in an embodiment in accordance with the invention. Characteristics database 114 stores one or more defining characteristics that central processing device 108 can access to identify an RF transmitter or transmitter type. When one or more of RF receivers 102, 104, 106 transmit RF data to central processing device 108 for processing, central processing device 108 analyzes the RF data to determine whether one or more defining characteristics stored in characteristics database 114 are present in the RF data. The one or more defining characteristics are used to identify a RF transmitter or transmitter type. If the one or more defining characteristics are present in the RF data, the use of a known RF transmitter or transmitter type has been detected in an embodiment in accordance with the invention.

Figure 3:
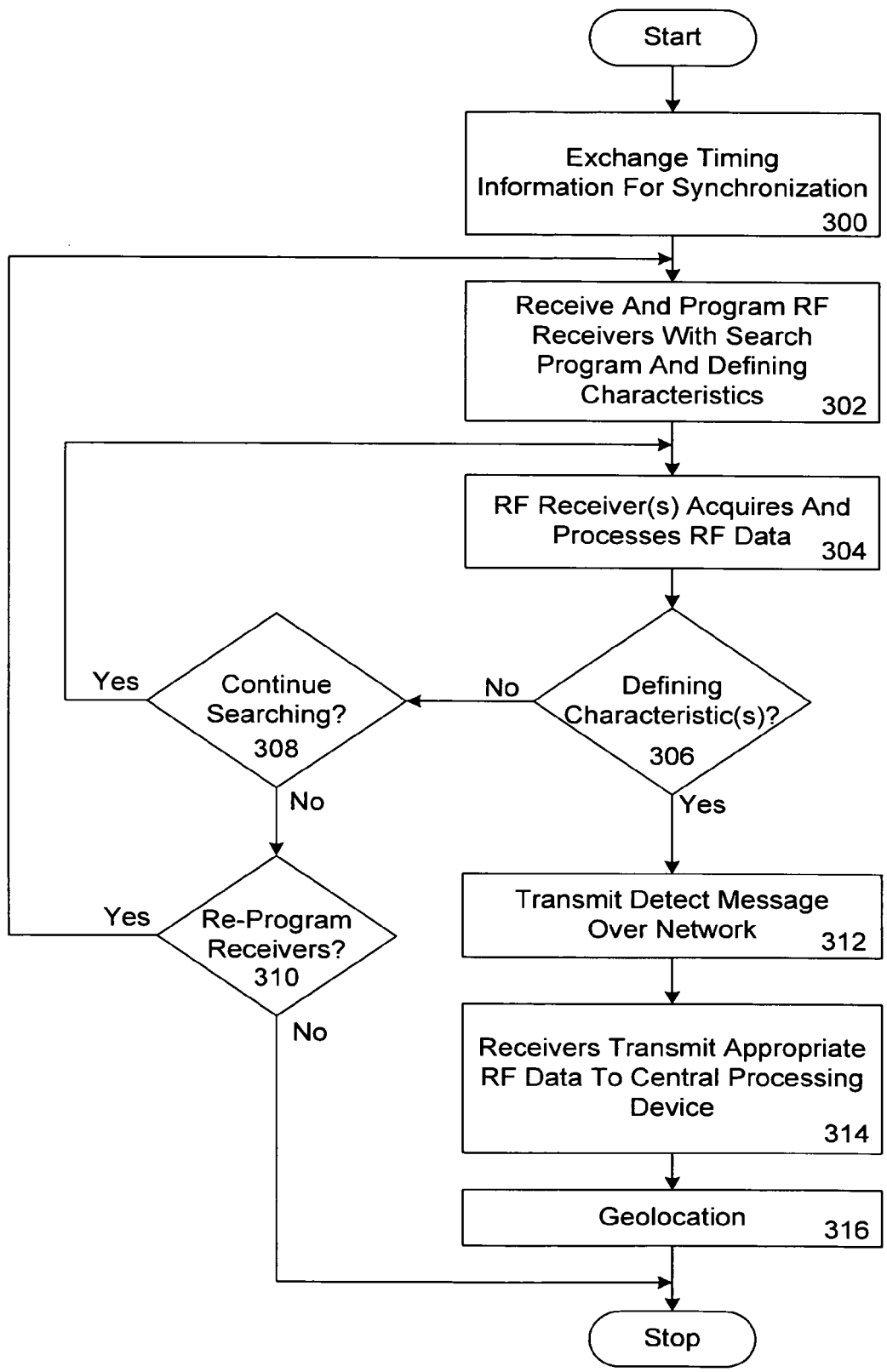
FIG. 3 is a flowchart of a first method for detecting an RF transmitter or transmitter type using a network of programmable RF receivers in an embodiment in accordance with the invention.
Figure 4:
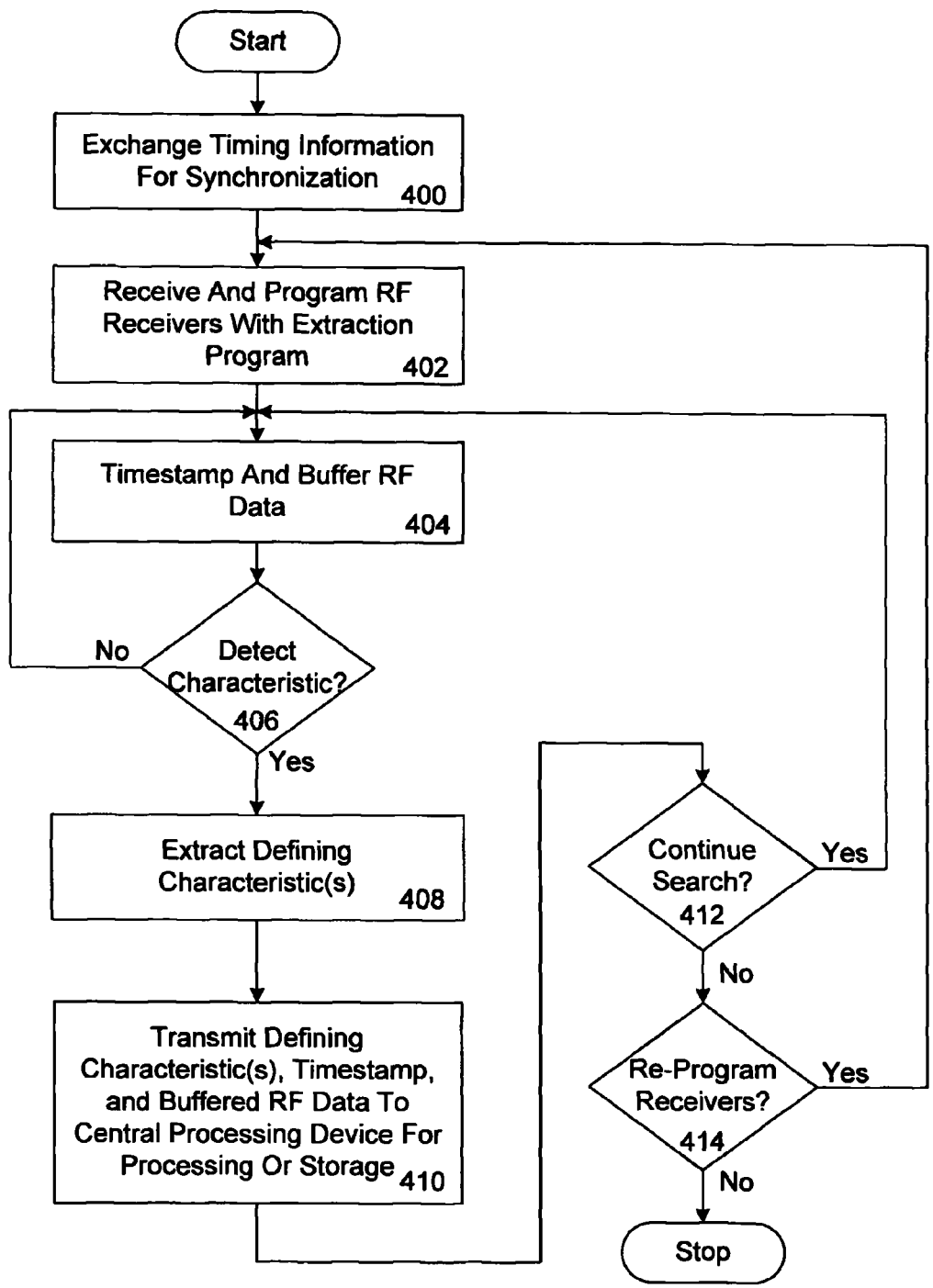
FIG. 4 is a flowchart of a second method for detecting an RF transmitter or transmitter type using a network of programmable RF receivers in an embodiment in accordance with the invention.
Figure 5:
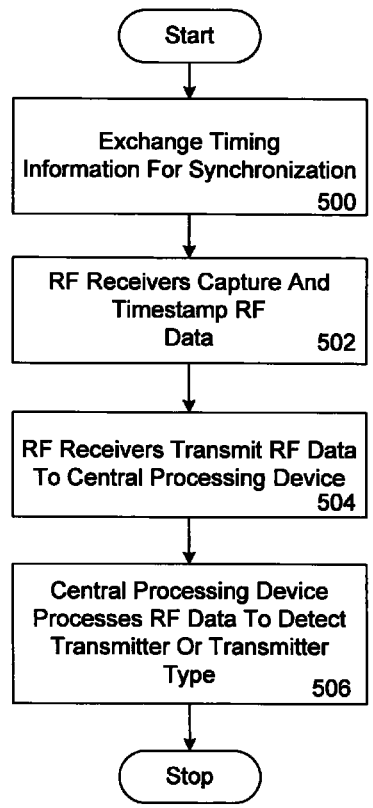
FIG. 5 is a flowchart of a third method for detecting an RF transmitter or transmitter type using a network of programmable RF receivers in an embodiment in accordance with the invention.

In another embodiment in accordance with the invention, one or more RF receivers are programmed to independently process RF data to determine whether the one or more defining characteristics are present in RF data. And in yet another embodiment in accordance with the invention, one or more RF receivers are programmed to extract one or more defining characteristics from RF data and transmit the extracted defining characteristic or characteristics to central processing device 108 for processing and analysis. FIGS. 3-5 depict methods for detecting an RF transmitter or transmitter type using a network of programmable RF receivers in embodiments in accordance with the invention.

Although FIG. 1 depicts three RF receivers 102, 104, 106 in network 100, embodiments in accordance with the invention can include any number of RF receivers. The number of RF receivers depends on the application. Moreover, network 100 includes other types networking devices in other embodiments in accordance with the invention. For example, network 100 includes repeaters and routers in other embodiments in accordance with the invention. And finally, embodiments in accordance with the invention are not limited to the topology shown in FIG. 1. Networks of RF receivers may be arranged in any topology in other embodiments in accordance with the invention.

Figure 2:
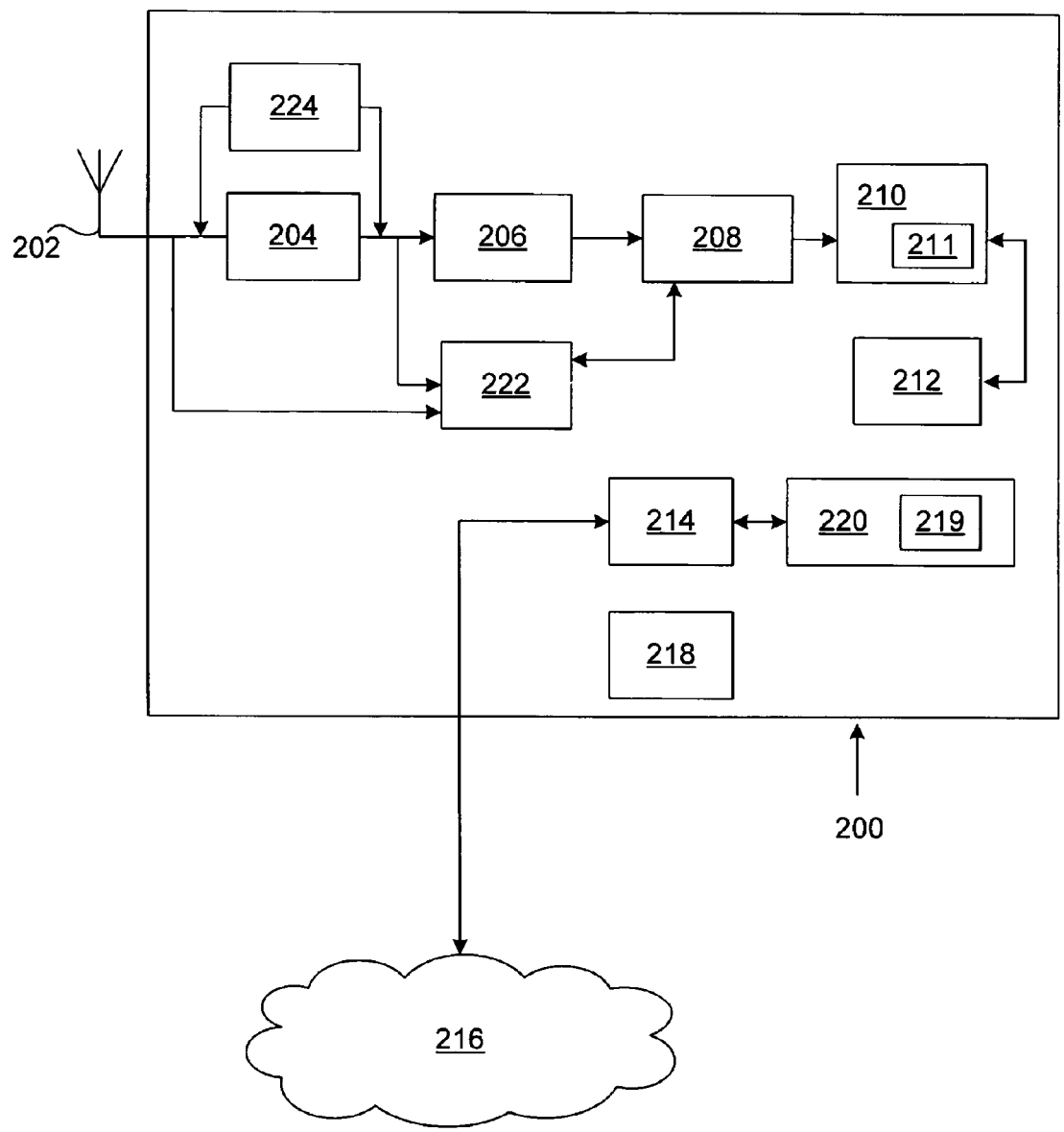
FIG. 2 is a block diagram of an RF receiver in an embodiment in accordance with the invention.

FIG. 2 is a block diagram of an RF receiver in an embodiment in accordance with the invention. RF receiver 200 includes antenna 202 that transmits or receives RF data or signals. Although only one antenna is shown in FIG. 2, RF receiver 200 may include multiple antennas in other embodiments in accordance with the invention.

Downconverter 204 receives RF data from antenna 202 and converts the RF data to a particular frequency spectrum. The RF data are then transmitted to digitizer 206, which converts the analog RF data to digital data. The digitized data are input into digital intermediate frequency (IF) 208. Digital IF 208 is a variable digital IF in an embodiment in accordance with the invention that variably limits the signal bandwidth and sample rate. Digital IF 208 also provides additional spectral isolation and enhancement of the receiver frequency and time-stamps the RF data that is stored in memory 210.

Downconverter 204 has a bandwidth that is equal to or greater than the bandwidth of the digital IF in an embodiment in accordance with the invention. Downconverter 204 has narrower bandwidths, fixed or selectable, that limit the bandwidth to improve performance by eliminating, or reducing the levels of unwanted adjacent signals before digitizer 206 in other embodiments in accordance with the invention. As the bandwidth of digital IF 208 is adjusted to match the signal to be detected, the output sample rate of digital IF 208 is also adjusted to a rate that is sufficient to preserve information while at the same time maximizing memory utilization. Beyond a certain sample rate, no additional information is retained, memory is wasted, and signals can be recorded for less time. The combination of downconverter 204 and digital IF 208 provide the flexibility necessary to deal with a wide variety of signal types. When dealing with a fixed set of known signal formats, downconverter 204 and digital IF 208 may provide less flexibility in other embodiments in accordance with the invention.

The interval between time samples at the output of digital IF 208 may be longer than the accuracy required for a given application. For example, a signal with a 1 kHz bandwidth can be perfectly represented by complex samples (real and imaginary, or I and Q), taken at a 1 kHz rate or at 1 millisecond intervals. For geolocation, the accuracy required may be 50 nanoseconds or better. The data output from digital IF 208 and input into memory 210 is time-stamped with sufficient precision and accuracy for the application, independent of the sample rate going into, or coming out of digital IF 208. In another embodiment in accordance with the invention, a time is associated with a portion of the samples. For example, a time is associated with only one sample when the samples are evenly spaced and the sample rate is known.

Memory 210 stores data and defining characteristics database 211. Digital signal processor 212 reads the buffered data from memory 210 and processes the digital data. Examples of data processing that may be performed by digital signal processor 212 include, but are not limited to, signal compression, demodulation, defining characteristic identification and extraction, and data reduction. Digital signal processor 212 uses one or more search or extraction algorithms to determine whether one or more defining characteristics in database 211 are present in RF data in an embodiment in accordance with the invention.

One or more search algorithms, extraction algorithms, and defining characteristics are downloaded into RF receiver 200 through network controller 214. Network controller 214 also transmits data to another device or receives data from another device in network 216. The other device may be another RF receiver or a central processing device (e.g., 108 in FIG. 1). Device controller 218 formats the data for transmission over a network, initiates or regulates data acquisition and transfer, and provides other controller functions.

Network controller 214 also exchanges timing information over network 216 that is used to synchronize receiver clock 219 in time controller 220 to a common time in an embodiment in accordance with the invention. The common time is defined by a common network clock (e.g., 110 in FIG. 1). In other embodiments in accordance with the invention, receiver clock 219 acts as a common network clock and network controller 214 exchanges timing information with the other RF devices in network 216 to synchronize the RF receivers to the common time as defined by receiver clock 219.

Time controller 220 distributes timing information to the other components in RF receiver 200. Time controller 220 provides data to digital IF 208 to allow digital IF 208 to time-stamp data or events with a time of day. Time controller 220 may also provide accurate timing information to digitizer 206 and serves as a frequency reference for downconverter 204, which improves the quality of the signal, improves tuning accuracy, and provides long term frequency stability. Time controller 220 may also improve short term timing stability by using high-quality oscillators in an embodiment in accordance with the invention. In another embodiment in accordance with the invention, time controller 220 serves as a temporary timing service when the network timing services are degraded or unavailable. In another embodiment in accordance with the invention, time controller receives timing information from other types of devices or systems, such as, for example GPS.

And in yet another embodiment in accordance with the invention, time controller 220 provides only a frequency reference to digitizer 206. In this embodiment, the samples from one RF receiver have no particular alignment to samples from a second receiver 104. This random phasing of the sample clocks is compensated for in the signal processing algorithms in central processing device 108. This is done in the time domain, for example, by noting the differences in the time-stamps and re-sampling the signal from one receiver (e.g., receiver 102) so that the samples are time-aligned with the samples from another receiver (e.g., receiver 104). Other methods may also be used depending on the processing. For example, the cross-spectrum between the two signals may be computed and multiplied by a phase ramp, the slope of which corresponds to the time-stamp difference.

Trigger circuit 222 triggers action or the cessation of action within RF receiver 200. By way of example only, trigger circuit 222 can trigger data acquisition or the cessation of data acquisition within RF receiver 200. Memory 210 may therefore contain all samples leading up to the trigger event, all samples occurring after the trigger event, or combination of samples from before and after the trigger event.

In an embodiment in accordance with the invention, trigger circuit 222 is implemented as an event trigger that triggers when a trigger criterion, or criteria, is met. For example, in one embodiment in accordance with the invention, trigger circuit 222 triggers when an amplitude or frequency of the RF data received from antenna 202 meets or exceeds a predetermined value, or when a trigger message is received. In another embodiment in accordance with the invention, characteristics of the RF data output from downconverter 204 or RF data in digital IF 208 can trigger circuit 222. And in yet another embodiment in accordance with the invention, the trigger criterion or criteria may be a time or day or an event or input that originates outside of receiver 200, such as, for example, a trigger input, lighting detector, or door alarm.

Calibration circuit 224 is used to characterize the signal paths in RF receiver 200. For example, calibration circuit 224 injects signals into either the RF signal received from antenna 202 or the IF signal output from downconverter 204 to compensate for group delay and amplitude errors.

Although only one receiver channel is shown in FIG. 2, RF receiver 200 may include multiple receiver channels in other embodiments in accordance with the invention. Data from the multiple receiver channels may be combined in receiver 200 before it is transmitted to the central processing device. For example, data from the multiple receiver channels are combined to perform beam steering. Alternatively, data from the receiver channels are not combined but transmitted to the central processing device for processing.

Referring now to FIG. 3, there is shown a first method for detecting an RF transmitter or transmitter type using a network of programmable RF receivers in an embodiment in accordance with the invention. Initially timing information is exchanged with the RF receivers a network, as shown in block 300. The timing information is exchanged between a central processing device and the RF receivers in an embodiment in accordance with the invention. The timing information includes information about the time of a common network clock to allow the RF receivers to synchronize their receiver clocks to the common time.

Each RF receiver then receives and is programmed with one or more search programs and one or more defining characteristics, as shown in block 302. One or more of the RF receivers receives, time-stamps, and buffers RF data (block 304). A determination is then made at block 306 as to whether one or more defining characteristics are present in the RF data acquired by an RF receiver or receivers. If not, the process passes to block 308 where a determination is made as to whether the search or monitoring for an RF transmitter is to continue.

If the search or monitoring is to continue, the method returns to block 304. If the search or monitoring for an RF transmitter is not to continue, a determination is made at block 310 as to whether the RF receivers are to be re-programmed. If the RF receivers are is to re-programmed, the process returns to block 302. By way of example only, one or more receivers may be reprogrammed to a different frequency or bandwidth.

Referring again to block 306, if the one or more defining characteristics are detected in the RF data the method continues at block 312 where a detect message is transmitted over the entire network or a portion of the network. The detect message informs the central processing device and the other RF receivers that the RF transmitter or transmitter type may have been detected. The detect message includes a time-stamp of when the receiver detected the characteristic, the location of the receiver, and the characteristic that was detected in an embodiment in accordance with the invention.

Each receiver that receives the detect message reads the appropriate RF data from memory and transmits the data to the central processing device (block 314). The receiver or receivers use the time-stamp to determine which RF data in the buffer is the appropriate RF data. The receiver or receivers will respond even though the signal was too weak for the receiver to detect, or the signal failed to meet the trigger criterion at the receiver, as may occur when the signal power is low, or the RF receivers are far apart.

The central processing device then determines the location of the transmitter (block 316) one embodiment in accordance with the invention. The central processing device may perform other functions in other embodiments in accordance with the invention. For example, the central processing device tracks the RF transmitter in another embodiment in accordance with the invention.

And in yet another embodiment in accordance with the invention, one or more RF receivers may broadcast a message to its neighbors that includes the operating frequency of the transmitter. This allows the RF receivers not tuned to that frequency to tune to that frequency and track the RF transmitter as the transmitter moves around the area monitored by the network of RF receivers. By way of example only, the RF receiver or receivers may each maintain a neighbor list and transmit messages only to the RF receivers on the list. Alternatively, an RF receiver may determine if it is in the neighborhood by reading the location information in a message broadcast to all sensors. And as another example, the central processing device may be responsible for defining neighborhoods by keep track of RF receiver locations.

FIG. 4 is a flowchart of a second method for detecting an RF transmitter or transmitter type using a network of programmable RF receivers in an embodiment in accordance with the invention. Initially timing information is exchanged with the RF receivers in a network, as shown in block 400. The timing information is exchanged between a central processing device and the RF receivers in an embodiment in accordance with the invention. The timing information includes information about the time of a common network clock to allow the RF receivers to synchronize their receiver clocks to the common time.

Each RF receiver then receives and is programmed with one or more extraction programs, as shown in block 402. The extraction programs are capable of extracting one or more defining characteristics from RF data. Next, at block 404, one or more RF receivers receive, time-stamp, and buffer RF data. A determination is then made at block 406 as to whether a defining characteristic or characteristics are detected in the RF data acquired by one or more RF receivers. If not, the process returns to block 404 and repeats until one or more defining characteristics are detected.

When a defining characteristic or characteristics are detected, the process passes to block 408 where one or more defining characteristics are extracted from the RF data using an extraction program. The RF data, the time-stamp associated with the RF data, and the extracted defining characteristic or characteristics are then transmitted by one or more receivers to a central processing device for storage or further processing (block 410). For example, the central processing device may compare the extracted one or more defining characteristics with characteristics stored in its defining characteristics database in an embodiment in accordance with the invention. If the extracted characteristics match a known characteristic, the RF data and time-stamps received from two or more receivers may be used to locate the RF transmitter. In another embodiment in accordance with the invention, the central processing device may store the RF signal data and extracted one or more defining characteristics in memory.

A determination is then made at block 412 as to whether the search or monitoring for an RF transmitter or transmitter type is to continue. If so, the method returns to block 404. If not, a determination is made at block 414 as to whether the RF receivers are to be re-programmed. If the receivers are to be re-programmed, the method returns to block 402 and repeats.

Referring to FIG. 5, there is shown a flowchart of a third method for detecting an RF transmitter or transmitter type using a network of programmable RF receivers in an embodiment in accordance with the invention. The method of FIG. 5 may be performed continuously, at different time periods in a day, or upon command. Initially timing information is exchanged with the RF receivers in a network, as shown in block 500. The timing information is exchanged between a central processing device and the RF receivers in an embodiment in accordance with the invention. The timing information includes information about the time of a common network clock to allow the RF receivers to synchronize their receiver clocks to the common time.

One or more RF receivers then acquire and time-stamp RF data, as shown in block 502. The RF receiver or receivers transmit the time-stamped RF data to a central processing device in the network (block 504). The central processing device then processes the RF data at block 506 to detect an RF transmitter or transmitter type. Processing of the RF data includes determining whether one or more defining characteristics are present in the RF data received from one or more receivers in an embodiment in accordance with the invention. If so, the defining characteristic or characteristics are compared with the data in the defining characteristics database to determine whether the defining characteristics in the RF data match with a known RF transmitter or transmitter type. If so, the RF transmitter is tracked using some or all of the RF receivers in the network in an embodiment in accordance with the invention. In another embodiment in accordance with the invention, the RF transmitter or transmitter type is geolocated using RF data received from two or more RF receivers in the network.

Figure 6:
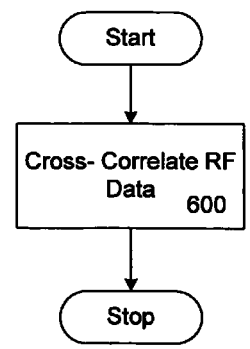
FIG. 6 is a flowchart of a first method for processing RF data as shown in block 410 in FIG. 4 and block 506 in FIG. 5.

FIG. 6 is a flowchart of a first method for processing RF data as shown in block 410 in FIG. 4 and block 506 in FIG. 5. The central processing device receives RF data from two or more receivers and correlates pairs of data, as shown in block 600. The central processing device uses the cross-correlation of the RF data received from some or all of the receivers in the network to determine if one or more defining characteristics are present. The defining characteristic or characteristics are then used to identify an RF transmitter or transmitter type. If a transmitter is moving, or if one or more of the RF receivers have a frequency error, it may be necessary to correct for the frequency shift between data from receivers before, or as part of the cross-correlation computation. In addition to indicating the presence of a signal, the presence of a correlation peak or the placement and shape of the correlation peak can be used to help identify the type of signal, as well as the time difference of arrival between receiver pairings. The time difference of arrival information may then be used to determine the location of the RF transmitter or transmitter type.

Figure 7:
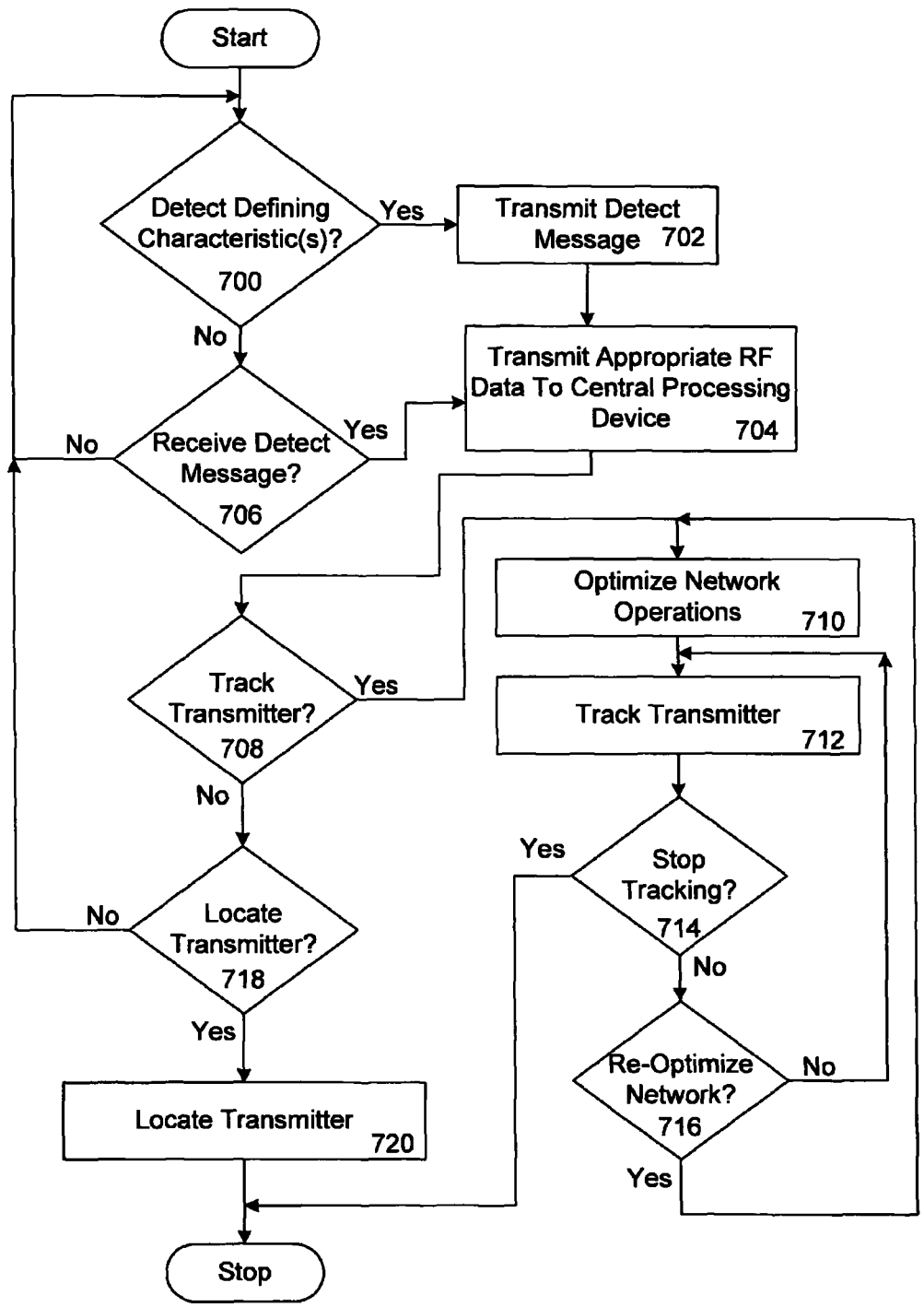
FIG. 7 is a flowchart of a method for using a network of programmable RF receivers in an embodiment in accordance with the invention.

Referring to FIG. 7, there is shown a flowchart of a method for using a network of programmable RF receivers in an embodiment in accordance with the invention. Initially a determination is made at block 700 as to whether one or more RF receivers have detected one or more defining characteristics. If so, the RF receiver detecting the characteristic or characteristics transmits a detect message over the network (block 702). The RF receivers that receive the detect message then read the appropriate RF data from their buffers and transmit the data to the central processing device (block 704).

If one or more defining characteristics are not detected, a determination is made as to whether a detection message has been received by the RF receivers and central processing device (block 706). If so, the RF receivers that receive the detect message then read the appropriate RF data from their buffers and transmit the data to the central processing device (block 704). If a detect message has not been received, the process returns to block 700.

Once the RF receivers have transmitted the appropriate RF data to the central processing device, a determination is made at block 708 as to whether the RF transmitter transmitting the RF signal that includes the one or more defining characteristics is to be tracked. If the RF transmitter is to be tracked, the method passes to block 710 where network operations are optimized by sub-dividing the network such that only the RF receivers near or in the same location as the transmitter track the transmitter. The central processing device transmits messages to the RF receivers in order to partition the network in an embodiment in accordance with the invention. The transmitter is then tracked at block 712 by one or more RF receivers in the network.

Next, at block 714, a determination is made as to whether tracking of the RF transmitter is to continue. If so, a determination is made at block 716 as to whether the network is to be re-optimized. For example, an RF transmitter or transmitter type may be moving and different RF receivers are therefore disabled since the transmitter has moved away from the receivers and different receivers in the network enabled to track the transmitter. If the network is to be re-optimized, the process returns to block 710. If, not the method returns to block 712.

Referring again to block 708, if the transmitter or transmitter type is not to be tracked, the method continues at block 718 where a determination is made as to whether the RF transmitter is to be located. If the location of the transmitter is to be determined, the transmitter is located at block 720. For example, RF data received by multiple RF receivers are transmitted to the central processing device for cross-correlation to geolocate the transmitter in an embodiment in accordance with the invention. The process ends if the location of the transmitter is not to be determined.

The invention claimed is:

1. A programmable radio frequency (RF) receiver among a plurality of RF receivers in a sensor network for at least one of detecting and locating one or more RF transmitters using RF data received from the one or more RF transmitters, the programmable RF receiver comprising:
 a network controller operable to download a search program received over the sensor network; and
 a signal processor operable to determine whether one or more defining characteristics associated with at least one of an RF transmitter or a transmitter type is present in the received RF data using a search algorithm of the downloaded search program,
 wherein the plurality of RF receivers in the sensor network, including the programmable RF receiver, are positioned at different locations.

2. The programmable RF receiver of claim 1, wherein the network controller is further operable to download defining characteristics over the sensor network, the programmable RF receiver further comprising:
 a memory operable to store the defining characteristics downloaded by the network controller.

3. The programmable RF receiver of claim 2, wherein the signal processor determines whether the one or more defining characteristics are in the received RF data using the search algorithm and the stored defining characteristics.

4. The programmable RF receiver of claim 1, further comprising:
 an antenna operable to receive the RF data transmitted by the one or more RF transmitters;
 a downconverter connected to the antenna;
 a digitizer connected to the downconverter;
 a digital intermediate frequency (IF) connected to the digitizer; and
 a time controller operable to provide timing information to the digital IF.

5. The programmable RF receiver of claim 4, wherein the memory is further operable to store the received RF data and one or more time-stamps generated by the digital IF, wherein each time-stamp is associated with a portion of the received RF data stored in the memory and the signal processor is operable to read the received RF data from the memory using a respective time-stamp.

6. A method for at least one of detecting and locating a radio frequency (RF) transmitter or transmitter type using a sensor network comprising a central processing device and a plurality of RF receivers positioned at different locations, the method comprising:
 receiving at the plurality of RF receivers one or more defining characteristics from the central processing device through a network connection;
 receiving at the plurality of RF receivers at least one of a search program and an extraction program from the central processing device through the network connection;
 receiving at one or more of the RF receivers of the plurality of RF receivers RF data from an RF transmitter through corresponding antennas of the one or more RF receivers receiving the RF data;
 detecting whether the one or more defining characteristics are present in the received RF data using the at least one of the search program and the extraction program of the one or more RF receivers receiving the RF data;
 sending a detect message to the central processing device over the network connection when the one or more defining characteristics are detected in the received RF data using the search program of the one or more RF receivers receiving the RF data; and
 extracting and sending the one or more defining characteristics to the central processing device over the network connection when the one or more defining characteristics are detected in the received RF data using the extraction program of the one or more RF receivers receiving the RF data.

7. The method of claim 6, further comprising:
storing the one or more defining characteristics at the plurality of RF receivers.

8. The method of claim 7, further comprising:
programming the plurality of RF receivers with the search program.

9. The method of claim 8, wherein detecting whether the one or more defining characteristics are present in the received RF data comprises:
 searching the received RF data to identify a defining characteristic present in the received RF data; and
 determining whether the identified defining characteristic present in the received RF data matches the one or more defining characteristics.

10. The method of claim 6, further comprising:
programming the plurality of RF receivers with the extraction program.

11. The method of claim 6, further comprising:
sub-dividing the network to include only an RF receiver of the plurality of RF receivers near a location of the RF transmitter once the RF transmitter or transmitter type has been detected; and tracking the RF transmitter or transmitter type using the RF receiver in the sub-divided network.

12. The method of claim 6, further comprising:
sending the received RF data from the one or more RF receivers receiving the RF data to the central processing device over the network connection.

13. The method of claim 12, further comprising:
geolocating the RF transmitter or transmitter type using RF data received by two or more RF receivers of the one or more RF receivers receiving the RF data in the sensor network.

14. The method of claim 12, wherein detecting whether one or more defining characteristics are present in the received RF data comprises processing the RF data at the central processing device.

15. The method of claim 6, wherein receiving RF data at the one or more RF receivers of the plurality of RF receivers in the network comprises receiving non-time aligned RF data at two or more of the RF receivers.

16. The method of claim 6, wherein the network connection comprises a local area network (LAN) connection.

17. The method of claim 16, wherein the LAN connection comprises a wired connection.

18. A programmable radio frequency (RF) receiver among a plurality of RF receivers in a sensor network for at least one of detecting and locating one or more RF transmitters using RF data received from the one or more RF transmitters, the programmable RF receiver comprising:
a network controller operable to download an extraction program received over the sensor network; and
a signal processor operable to extract one or more defining characteristics associated with at least one of an RF transmitter or a transmitter type is present in the received RF data using an extraction algorithm of the downloaded extraction program,
wherein the plurality of RF receivers in the sensor network, including the programmable RF receiver, are positioned at different locations.

19. The programmable RF receiver of claim 18, wherein the network controller is further operable to download defining characteristics over the sensor network, the programmable RF receiver further comprising:
a memory operable to store the defining characteristics downloaded by the network controller over the sensor network.

20. The programmable RF receiver of claim 19, wherein the signal processor extracts the one or more defining characteristics from the received RF data using the extraction algorithm and the stored defining characteristics.

21. The programmable RF receiver of claim 18, further comprising:
an antenna operable to receive the RF data transmitted by the one or more RF transmitters;
a downconverter connected to the antenna;
a digitizer connected to the downconverter;
a digital intermediate frequency (IF) connected to the digitizer; and
a time controller operable to provide timing information to the digital IF.

* * * * *